(12) United States Patent
Takahagi

(10) Patent No.: US 12,090,607 B2
(45) Date of Patent: Sep. 17, 2024

(54) OIL PULSE TOOL

(71) Applicant: MAKITA CORPORATION, Anjo (JP)

(72) Inventor: Koji Takahagi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 399 days.

(21) Appl. No.: 17/466,093

(22) Filed: Sep. 3, 2021

(65) Prior Publication Data

US 2022/0118589 A1  Apr. 21, 2022

(30) Foreign Application Priority Data

Oct. 16, 2020 (JP) ................................. 2020-174889

(51) Int. Cl.
| | | |
|---|---|---|
| B25B 21/02 | (2006.01) |
| B25F 5/00 | (2006.01) |
| H02K 5/20 | (2006.01) |
| H02K 7/14 | (2006.01) |
| H02K 9/04 | (2006.01) |

(Continued)

(52) U.S. Cl.
CPC .............. *B25B 21/02* (2013.01); *B25F 5/008* (2013.01); *H02K 5/20* (2013.01); *H02K 7/145* (2013.01); *H02K 9/04* (2013.01); *H02K 11/25* (2016.01); *H02P 29/60* (2016.02)

(58) Field of Classification Search
CPC ..... B25B 21/00; B25B 21/002; B25B 21/008; B25B 21/02; B25B 21/026; B25B 19/00; B25B 23/02; B25B 23/14; B25B 23/147; B25D 9/125; B25D 17/22; B25F 5/001; B25F 5/008; B25F 5/02; H02K 11/25; H02K 5/20; H02K 7/145; H02K 9/04; H02P 29/60

See application file for complete search history.

(56) References Cited

U.S. PATENT DOCUMENTS

2013/0300331 A1   11/2013  Nishii et al.
2017/0373567 A1*  12/2017  Nishizono .............. H05K 1/181
(Continued)

FOREIGN PATENT DOCUMENTS

| CN | 103386673 | * 11/2013 |
| CN | 107787545 | * 3/2018 |
| JP | 2006-289596 A | 10/2006 |

(Continued)

OTHER PUBLICATIONS

Mar. 5, 2024 Office Action issued in Japanese Application No. 2020-174889.

Primary Examiner — Robert J Scruggs
(74) Attorney, Agent, or Firm — Oliff PLC

(57) ABSTRACT

An oil pulse tool cools an oil unit and a motor. A soft impact driver includes a brushless motor, an oil unit located frontward from the brushless motor and driven by the brushless motor, a spindle located frontward from the oil unit and driven by the oil unit, a cylindrical portion and a rear cover accommodating the brushless motor and having outlets, a grip located below the cylindrical portion and the rear cover, and a unit case accommodating the oil unit and located frontward from the cylindrical portion and having an inlet. The inlet is located in the unit case alone, and the outlets are located in the cylindrical portion and the rear cover alone.

20 Claims, 12 Drawing Sheets

(51) Int. Cl.
  *H02K 11/25* (2016.01)
  *H02P 29/60* (2016.01)

(56) References Cited

U.S. PATENT DOCUMENTS

2018/0104810 A1\* 4/2018 Ito .......................... H02K 9/06
2022/0094251 A1  3/2022 Niwa

FOREIGN PATENT DOCUMENTS

| JP | 2010-120121 | \* | 6/2010 |
| JP | 2010-120121 | A | 6/2010 |
| JP | 2013-233631 | A | 11/2013 |
| JP | 2019-048383 | \* | 3/2019 |
| JP | 2019-048383 | A | 3/2019 |
| WO | 2020/137916 | A1 | 7/2020 |

\* cited by examiner

OIL PULSE TOOL

CROSS-REFERENCE TO RELATED APPLICATIONS

This application claims the benefit of priority to Japanese Patent Application No. 2020-174889, filed on Oct. 16, 2020, the entire contents of which are hereby incorporated by reference.

BACKGROUND

1. Technical Field

The present disclosure relates to an oil pulse tool including an oil unit for outputting impact torque.

2. Description of the Background

An oil pulse tool includes an oil unit that outputs rotation of a motor as intermittent impact torque (impact) from a spindle. The structure of a known oil unit is described in, for example, Japanese Unexamined Patent Application Publication No. 2019-48383. The structure includes a case containing oil, through which the rotation of the motor is transmitted, and a spindle having a rear portion placed in the case in a rotatable manner. The spindle receives, in the rear portion, a cam that rotates integrally with the case at the center of the case. The spindle accommodates a pair of balls and a pair of blades both in a radially movable manner in the rear portion outside the cam.

In the known oil unit, the cam integral with the case rotates as the case rotates, pushing the blades radially outward via the balls in the rear portion of the spindle. When the cam seals the rear portion in the case at a predetermined rotational position, the blades pushed out are retained at the position under the oil pressure. The blades hitting projections in the case produce impact torque (impact). Subsequently, when the cam rotates together with the case, the oil in the rear portion flows out to reduce the oil pressure. This allows the blades to retract into the rear portion and move relatively over the projections. The repeated motions of the blades being pushed out, hitting the projections, and retracting produce impacts intermittently. Another known oil unit without including balls may use rotation of a case relative to a spindle to swing the blades in the case and change the oil pressure to produce an impact.

BRIEF SUMMARY

In an oil pulse tool performing a continuous operation, the temperature of its oil unit may increase, possibly causing performance degradation or malfunctioning.

One or more aspects of the present disclosure are directed to an oil pulse tool that cools an oil unit and a motor.

A first aspect of the present disclosure provides an oil pulse tool, including:
 a motor;
 an oil unit located frontward from the motor and driven by the motor;
 a rotational shaft located frontward from the oil unit and driven by the oil unit;
 a motor housing accommodating the motor, the motor housing having an outlet;
 a grip located below the motor housing; and
 a unit case accommodating the oil unit and located frontward from the motor housing, the unit case having an inlet,
 wherein the inlet is located in the unit case alone, and the outlet is located in the motor housing alone.

The oil pulse tool according to the above aspect of the present disclosure cools the oil unit and the motor.

DETAILED DESCRIPTION

Embodiments of the present disclosure will now be described with reference to the drawings.

Figure 1:
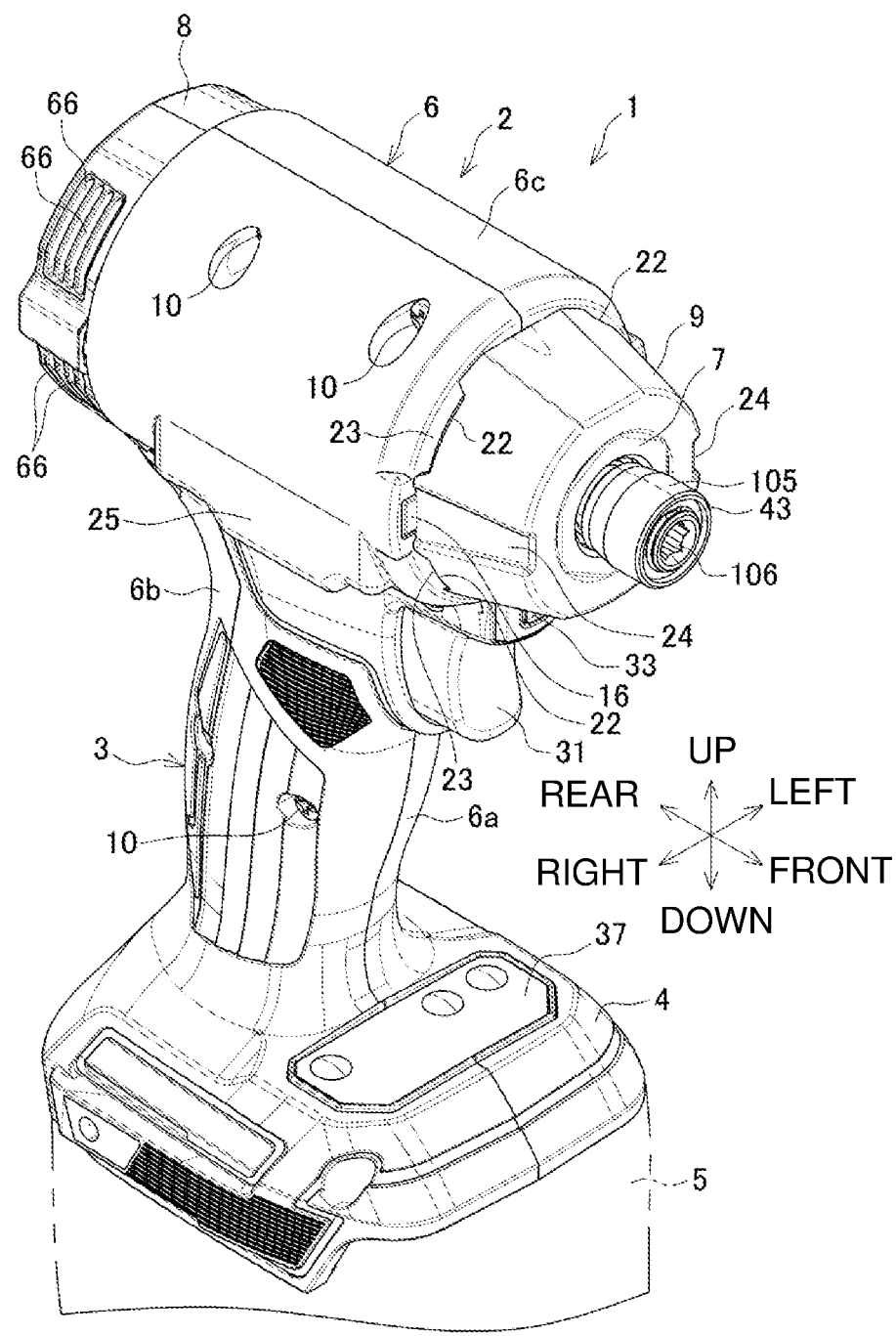
FIG. 1 is a perspective view of a soft impact driver.
Figure 2:
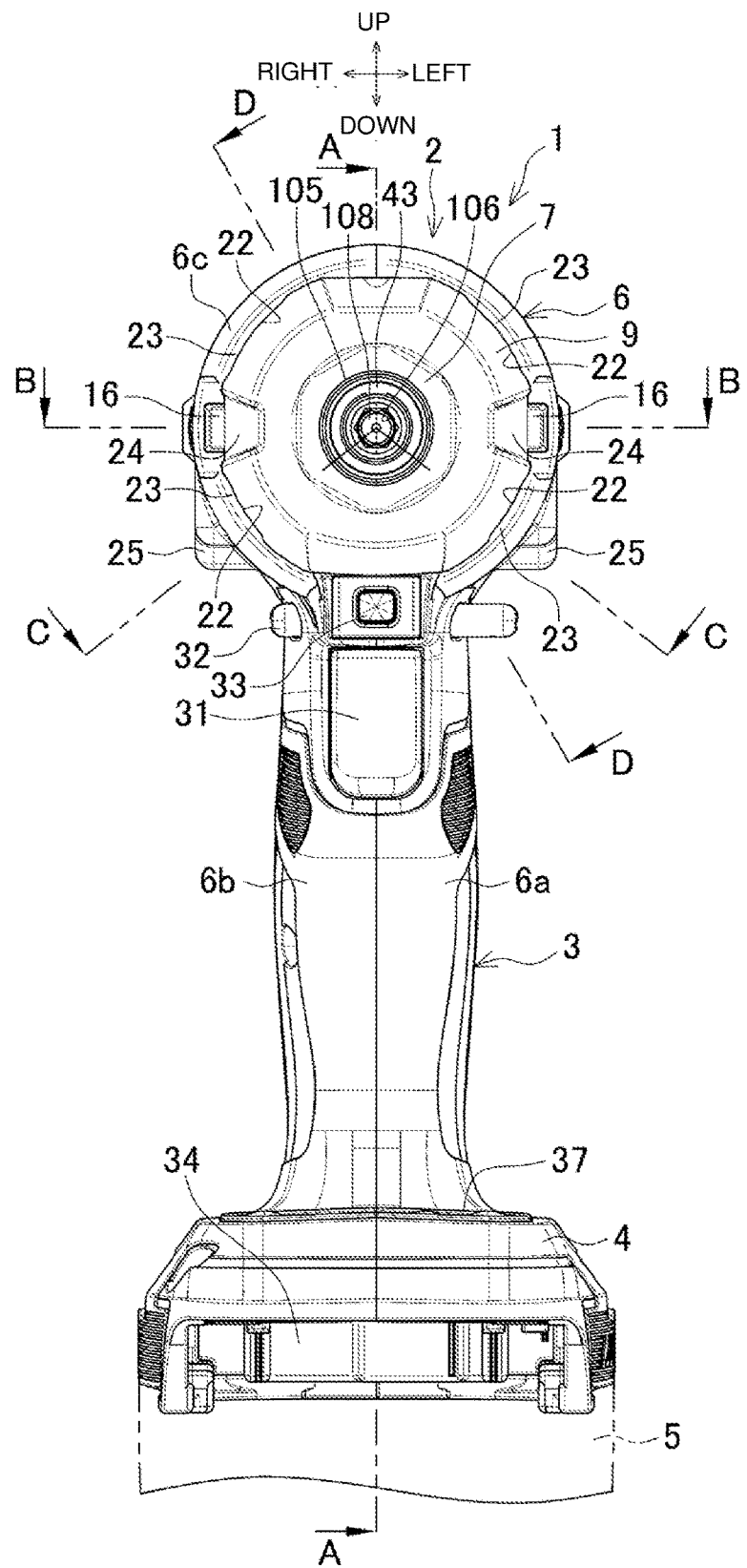
FIG. 2 is a front view of the soft impact driver.
Figure 3:
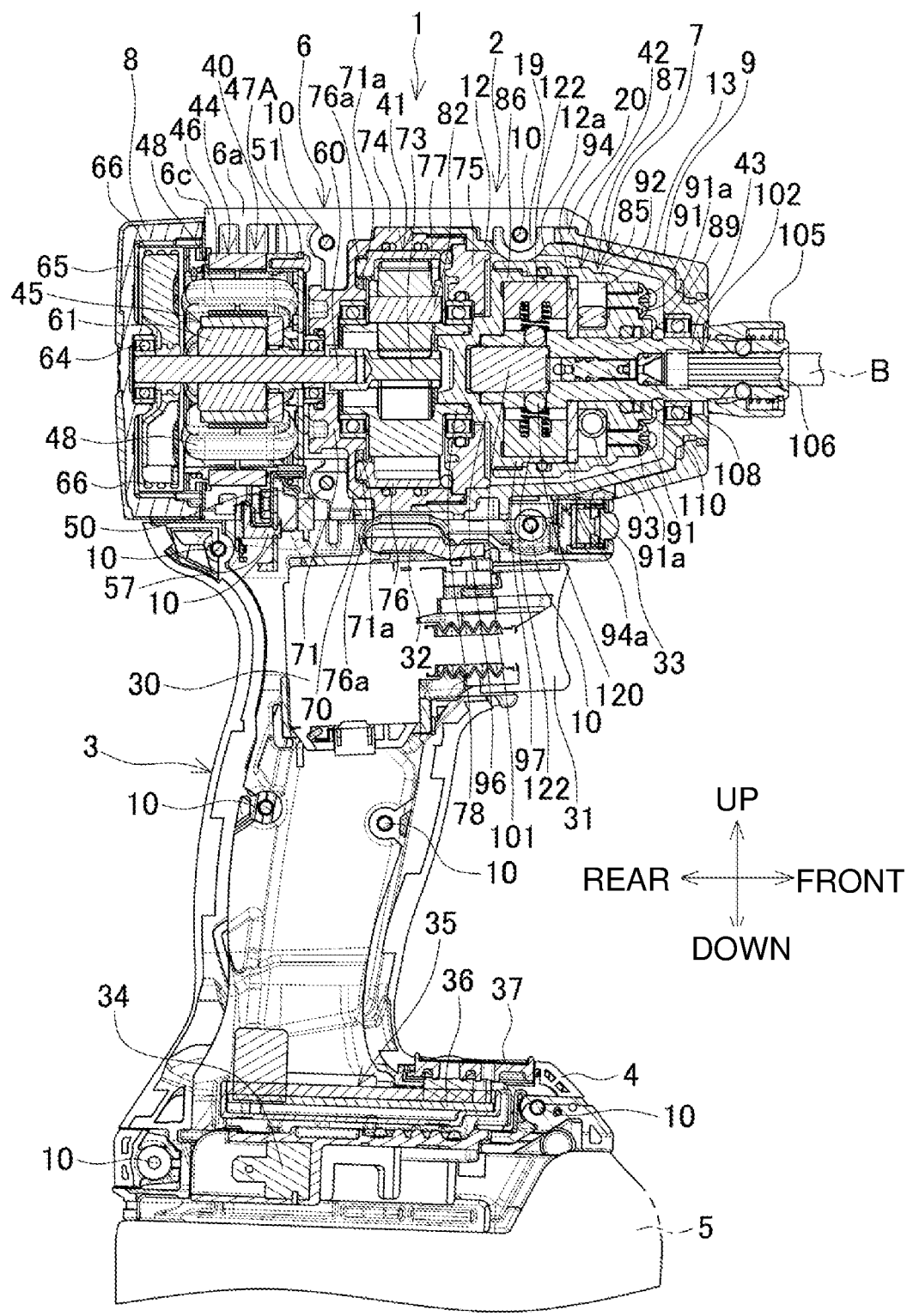
FIG. 3 is a cross-sectional view taken along line A-A in FIG. 2 with blades pushed out.
Figure 4:
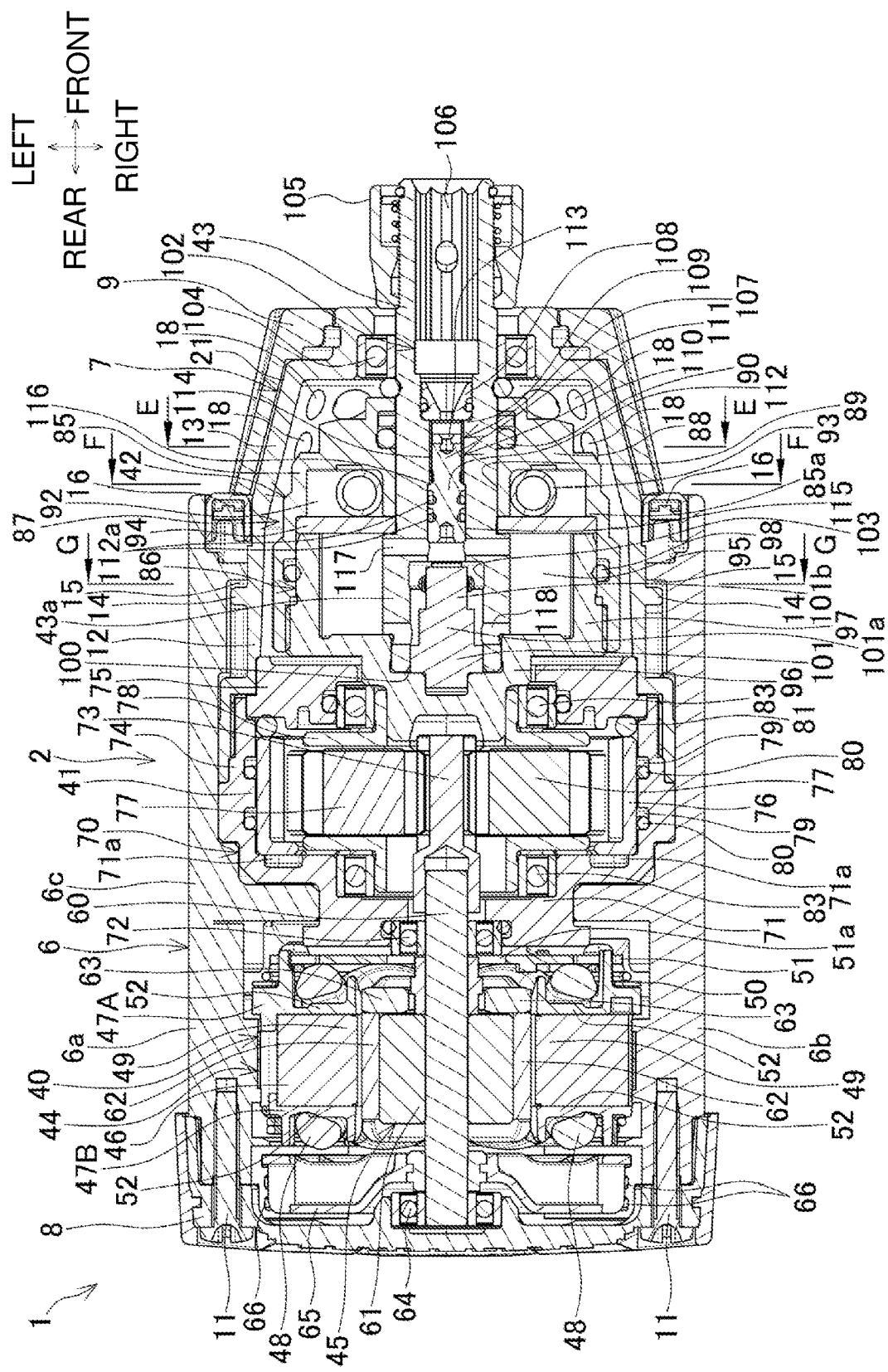
FIG. 4 is an enlarged cross-sectional view taken along line B-B in FIG. 2.

FIG. 1 is a perspective view of a rechargeable soft impact driver 1 as an example of an oil pulse tool. FIG. 2 is a front view of the soft impact driver 1. FIG. 3 is a cross-sectional view taken along line A-A in FIG. 2. FIG. 4 is an enlarged cross-sectional view taken along line B-B in FIG. 2.

A soft impact driver may also be referred to as an oil pulse driver or an impulse driver. An oil pulse tool according to one or more embodiments of the present disclosure may be any tool that includes an oil unit containing oil.

The soft impact driver 1 includes a body 2 and a grip 3. The body 2 has the central axis extending in the front-rear direction. The body 2 accommodates a brushless motor 40 and an oil unit 42. The grip 3 protrudes downward from the body 2. A battery mount 4 is located at the lower end of the grip 3. The battery mount 4 can receive a battery pack 5 as a power supply attachable from the front.

Figure 5:
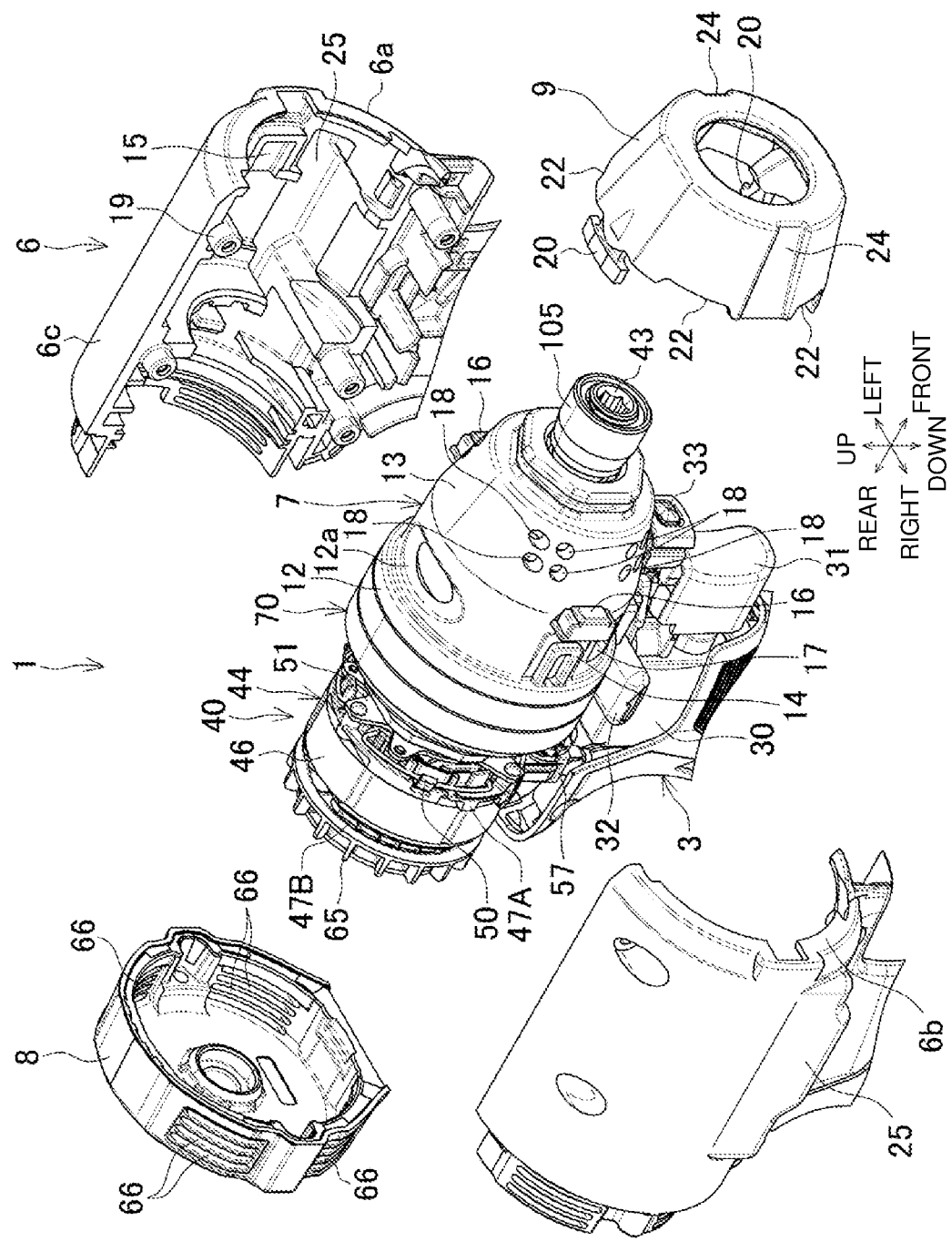
FIG. 5 is an exploded perspective view of a housing.

As shown in FIG. 5, the soft impact driver 1 includes a housing including a body housing 6, a unit case 7, a rear cover 8, and a unit case cover 9. The body housing 6 integrates a middle portion of the body 2, the grip 3, and the battery mount 4 together.

The body housing 6 includes a pair of left and right half housings 6a and 6b fastened with multiple screws 10. The body housing 6 includes, in its upper portion corresponding to the middle portion of the body 2, a cylindrical portion 6c extending in the front-rear direction.

The rear cover 8 is fastened to a rear portion of the cylindrical portion 6c from the rear with two screws, or right and left screws 11. The rear cover 8 closes the rear portion of the body 2. The cylindrical portion 6c and the rear cover 8 form a motor housing.

The unit case 7 includes a cylindrical rear portion 12 and a tapered cylindrical front portion 13. The rear portion 12 is held on the body housing 6. The front portion 13 protrudes from the body housing 6. The rear portion 12 has protrusions 14 on its right and left sides. The protrusions 14 are rectangular as viewed laterally. The half housings 6a and 6b each have a recess 15 on their inner surfaces. Each protrusion 14 is fitted in the corresponding recess 15. A pair of lamps 16 are located in front of the protrusions 14 and between the rear portion 12 and the body housing 6. The lamps 16 face frontward.

The rear portion 12 has a rectangular internal outlet 17 in each of its side surfaces and below the corresponding protrusion 14. The front portion 13 has multiple circular inlets 18 in each of its right and left sides. The rear portion 12 has a relief recess 12a on its upper surface. The relief recess 12a extends laterally to prevent interference between the rear portion 12 and screw bosses 19 for fastening the body housing 6.

Figure 6:
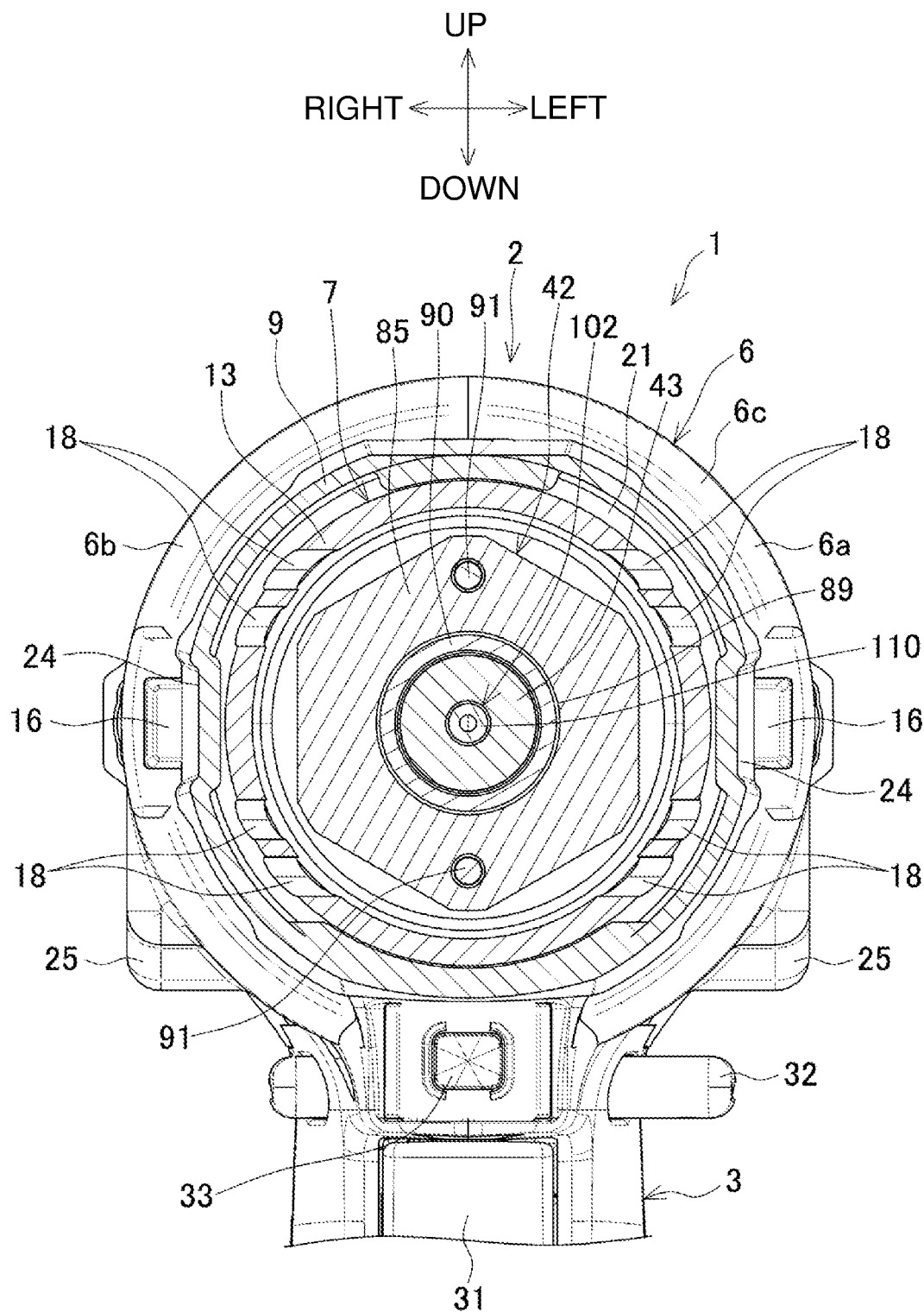
FIG. 6 is a cross-sectional view taken along line E-E in FIG. 4.

The unit case cover 9 is located frontward from the body housing 6 to cover the front portion 13 of the unit case 7 from the front. The unit case cover 9 is cylindrically tapered and slightly larger than the front portion 13. The unit case cover 9 has three engagement tabs 20 on its rear end, one at an upper position and two at lower right and left positions. Each engagement tab 20 extends rearward and is engaged with the front end of the body housing 6. In the assembled body housing 6, the engagement tabs 20 prevent the unit case cover 9 from slipping off frontward. The rear end of the unit case cover 9, except the engagement tabs 20, is in contact with the front end of the body housing 6. As shown in FIG. 6, a clearance 21 is defined between the front portion 13 and the unit case cover 9.

Figure 7:
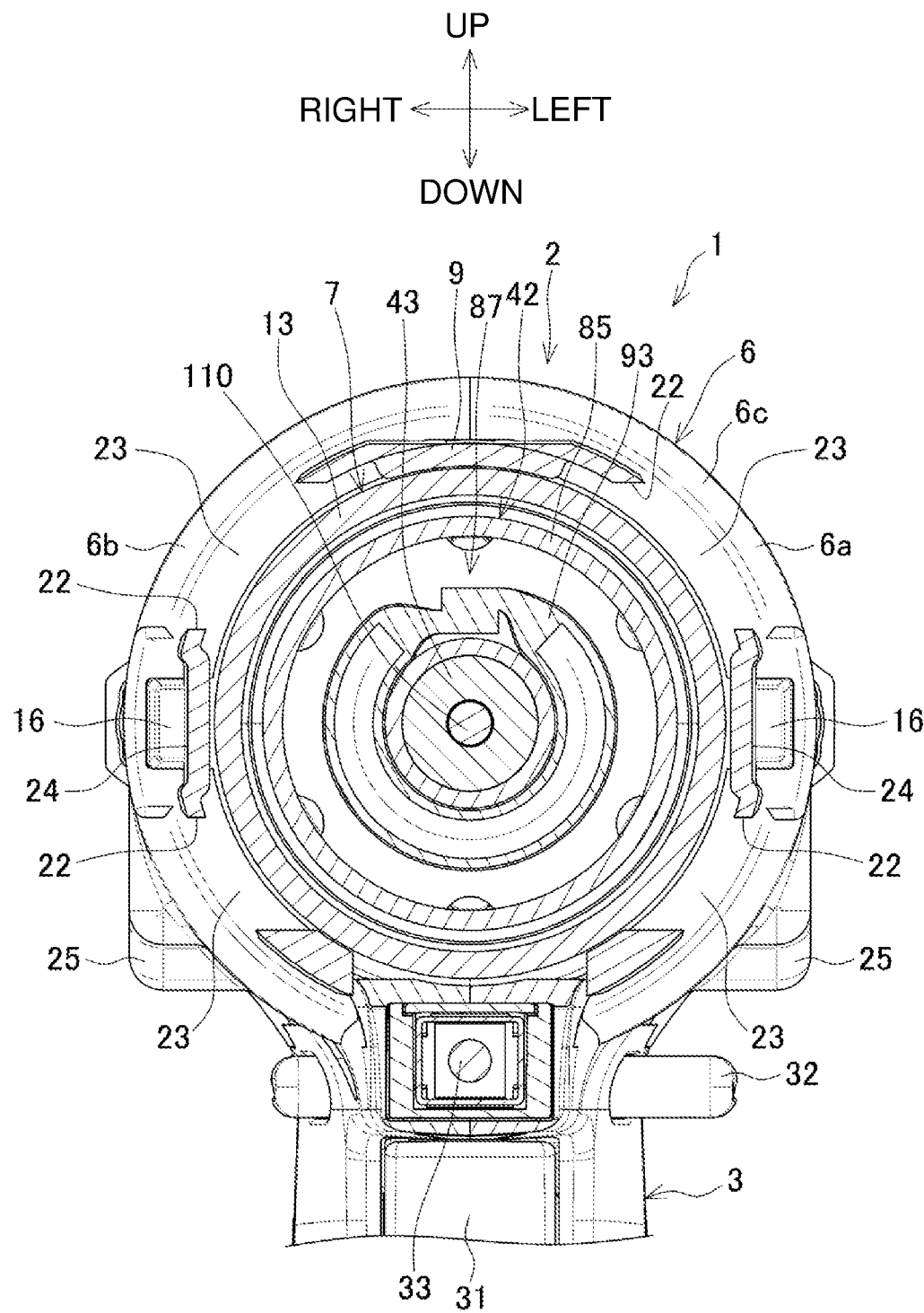
FIG. 7 is a cross-sectional view taken along line F-F in FIG. 4.

The unit case cover 9 has four cutouts 22 in the rear end. A pair of cutouts 22 are located in each of the right and left portions of the unit case cover 9. The pair of cutouts 22 are vertically arranged to have one lamp 16 between them. The cutouts 22 have rear portions closed with the front end of the body housing 6. Thus, four external inlets 23 are defined in the circumferential direction between the unit case cover 9 and the body housing 6 as shown in FIGS. 2 and 7. The external inlets 23 communicate with the inlets 18 in the front portion 13 through the clearance 21. The unit case cover 9 has a rectangular groove 24 in each of the right and left surfaces. The rectangular grooves 24 extend in the front-rear direction in front of the lamps 16. The rectangular grooves 24 direct light emitted from the lamps 16 forward.

Figure 8:
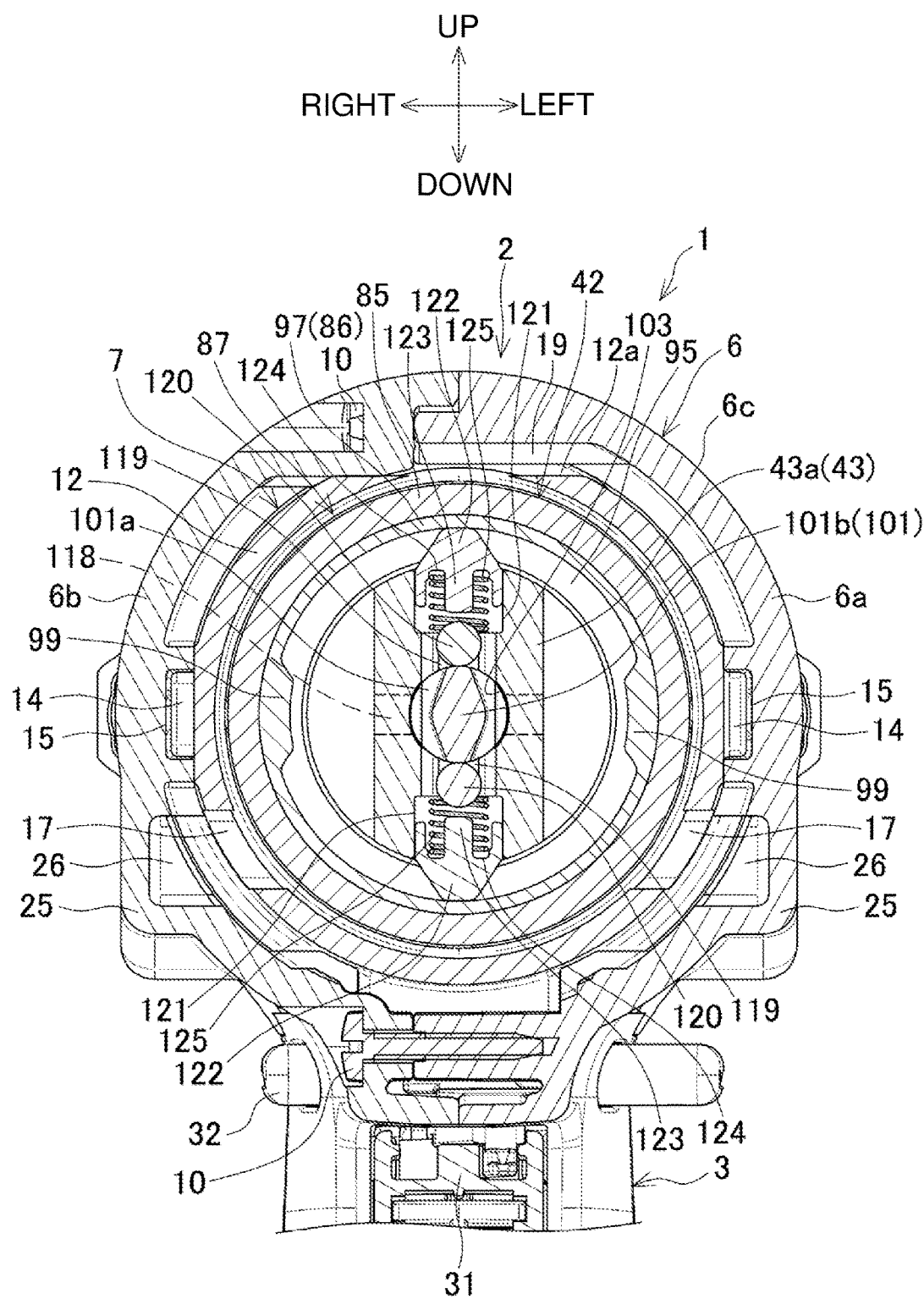
FIG. 8 is a cross-sectional view taken along line G-G in FIG. 4.
Figure 9:
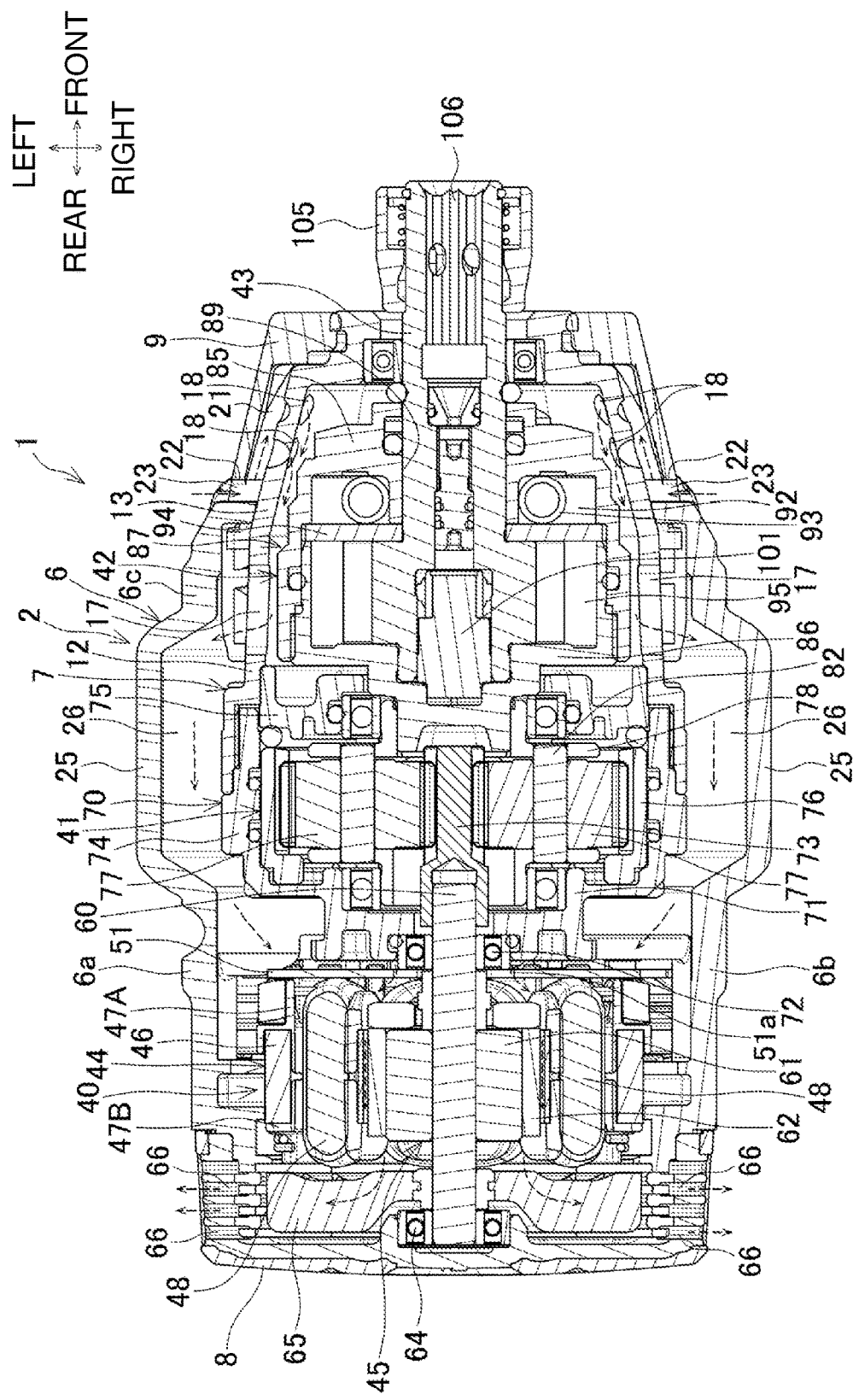
FIG. 9 is an enlarged cross-sectional view taken along line C-C in FIG. 2.

The cylindrical portion 6c in the body housing 6 has a pair of extensions 25 on its right and left side sides. As shown in FIG. 8, the extensions 25 extend downward from the right and left side surfaces of the cylindrical portion 6c and each have an L-shaped cross section. As shown in FIGS. 8 and 9, each extension 25 has its front end extending frontward to near the front end of the cylindrical portion 6c. Each extension 25 has its front end laterally overlapping the corresponding internal outlet 17 in the unit case 7. Each extension 25 has its rear end extending rearward and laterally overlapping a gear case 70 (described later).

As shown in FIG. 9, an air channel 26 is defined inside each extension 25. The air channels 26, located outside the unit case 7 and the gear case 70, allow communication between the internal outlets 17 and the space accommodating the brushless motor 40.

The grip 3 accommodates a switch 30 in its upper portion. A trigger 31 protrudes from a front portion of the switch 30. A forward-reverse switch button 32 is located above the switch 30. The forward-reverse switch button 32 is used to switch the rotation direction of the brushless motor 40. A pushbutton 33 for turning on and off the lamps 16 is located in front of the forward-reverse switch button 32.

The battery mount 4 accommodates a terminal block 34. The terminal block 34 is electrically connectable to the battery pack 5. A controller 35 is located above the terminal block 34. The controller 35 includes a control circuit board 36. The controller 35 is parallel to the terminal block 34. A switch panel 37 is located above the controller 35. The switch panel 37 includes, for example, an impact switch button. The switch panel 37 is exposed on the upper surface of the battery mount 4.

As shown in FIGS. 3 and 4, the body 2 accommodates, from the rear, the brushless motor 40, a reduction mechanism 41, and the oil unit 42 in the stated order. The oil unit 42 holds a spindle 43. The spindle 43 has a front end protruding frontward from the oil unit 42.

The brushless motor 40 includes a stator 44 and a rotor 45. The brushless motor 40 is an inner-rotor motor including the cylindrical stator 44 and the rotor 45 inside the stator 44. The stator 44 includes a cylindrical stator core 46. The stator core 46 is held on the cylindrical portion 6c. The stator core 46 is a multilayered steel plate. The stator 44 includes insulators 47A and 47B. The insulators 47A and 47B are fixed to the axially front and rear end faces of the stator core 46. The stator 44 includes multiple coils 48. The coils 48 are wound around multiple teeth 49 in the stator core 46 with the insulators 47A and 47B in between. The coils 48 are electrically connected to fuse terminals 50 held on the front insulator 47A to form a three-phase connection.

The front insulator 47A receives a sensor circuit board 51. The sensor circuit board 51 detects the positions of sensor permanent magnets 63 in the rotor 45 and outputs a rotational detection signal. The sensor circuit board 51 has a through-hole 51a at the center.

Figure 10:
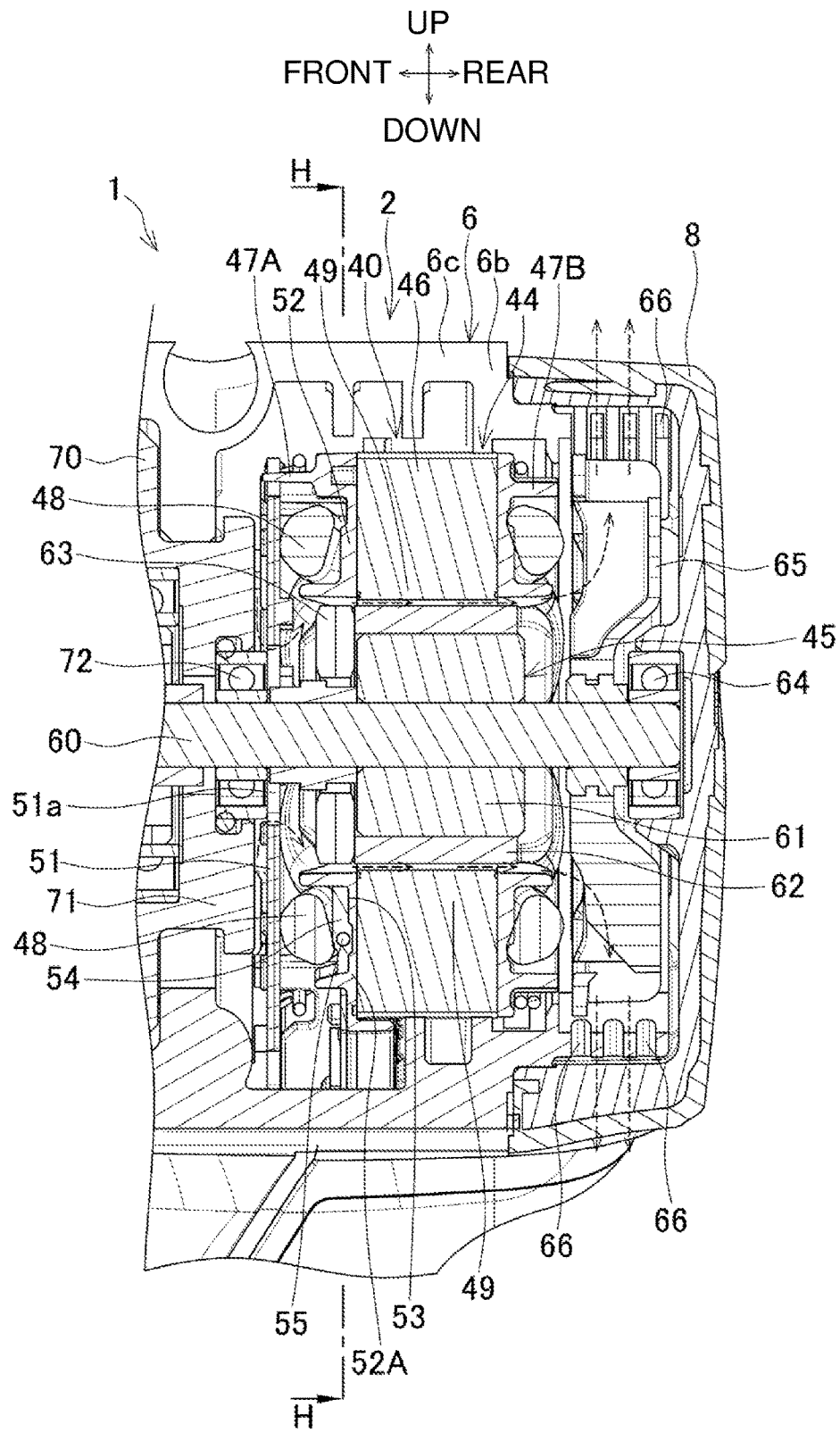
FIG. 10 is an enlarged cross-sectional view taken along line D-D in FIG. 2, showing a brushless motor alone.
Figure 11:
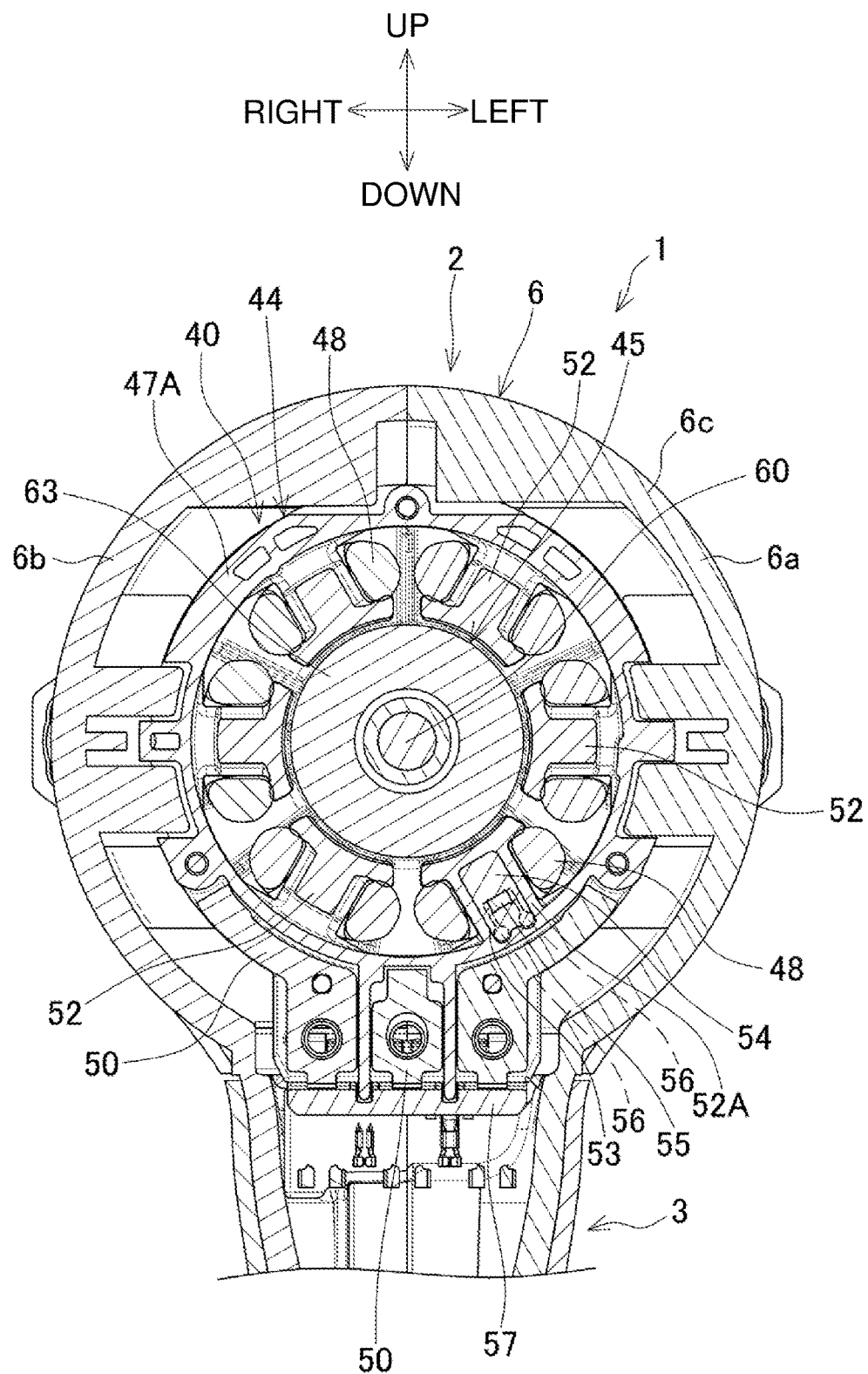
FIG. 11 is a cross-sectional view taken along line H-H in FIG. 10.

The insulators 47A and 47B include multiple covers 52. The covers 52 cover the front surfaces and the rear surfaces of the teeth 49, around which the coils 48 are wound. One of the covers 52 on a lower portion of the insulator 47A (hereafter, distinguished with reference numeral 52A) has its front surface having a recess 53 as shown in FIGS. 10 and 11. The recess 53 receives a resin temperature sensing plate 54 incorporating a thermistor 55 by insert molding. The thermistor 55 outputs, as a detection signal, the resistance that varies in accordance with temperature. The thermistor 55 includes positive and negative terminals 56 extending from the temperature sensing plate 54, through the insulator 47A, and outside the stator 44.

A connector 57 is fastened to a lower portion of the insulator 47A with screws. The connector 57 electrically connects the fuse terminals 50 to a three-phase power supply line from the control circuit board 36. The connector 57 also electrically connects the terminals 56 of the thermistor 55 to the control circuit board 36 with a lead wire.

The rotor 45 includes a rotational shaft 60 and a rotor core 61. The rotational shaft 60 extends along the axis of the rotor core 61. The rotor core 61 cylindrically surrounds the rotational shaft 60. The rotor core 61 includes multiple steel plates stacked on one another. The rotor 45 receives multiple cylindrical permanent magnets 62. The permanent magnets 62 are arranged outside the rotor core 61 to alternate in polarity. The rotor 45 receives the multiple sensor permanent magnets 63. The sensor permanent magnets 63 are fixed radially in front of the permanent magnets 62.

The rotational shaft 60 has a rear end held by a bearing 64. The bearing 64 is held at the center of the inner surface of the rear cover 8. The rotational shaft 60 receives a fan 65 in front of the bearing 64. The rear cover 8 has multiple outlets 66 in its right and left side surfaces outside the fan 65.

The body housing 6 holds the gear case 70 in front of the brushless motor 40. The gear case 70 includes a disk-shaped bearing holder 71. The bearing holder 71 supports, on its rear surface, the front end of the rotational shaft 60 via a bearing 72. The rotational shaft 60 receives a pinion 73 at its front end. The pinion 73 protrudes frontward through the gear case 70. The gear case 70 includes, on its outer circumference, a cylindrical portion 74 extending frontward. The cylindrical portion 74 has its distal end screwed into the rear end of the unit case 7. A disk-shaped cover plate 75 is located between the cylindrical portion 74 and the unit case 7. The cover plate 75 closes the rear end of the unit case 7. The cover plate 75 is engaged with the cylindrical portion 74 in a nonrotatable manner and held and fastened between the cylindrical portion 74 and the unit case 7.

The reduction mechanism 41 includes an internal gear 76, three planetary gears 77, and a carrier 78.

The internal gear 76 is fastened inside the cylindrical portion 74 of the gear case 70. The internal gear 76 has, on its rear end, multiple engagement protrusions 76a (FIG. 3) arranged at circumferentially predetermined intervals. The bearing holder 71 in the gear case 70 has, on its front surface, multiple engagement recesses 71a. The engagement recesses 71a receive the respective engagement protrusions 76a. The engagement protrusions 76a engaged with the engagement recesses 71a restrict rotation of the internal gear 76. The cylindrical portion 74 has, on its inner surface, a pair of front and rear annular grooves 79. The grooves 79 each receive an O-ring 80. The O-rings 80 are in contact with the outer circumference of the internal gear 76. The O-rings 80 prevent the vibrations of the internal gear 76. An O-ring 81 having a larger cross-sectional diameter than the O-ring 80 is located between the front end of the internal gear 76 and the cover plate 75. The O-ring 81 presses the internal gear 76 from the front against the bearing holder 71.

Each planetary gear 77 is supported by the carrier 78 with a pin 82 extending through the center of the planetary gear 77. Each pin 82 has its front and rear ends supported by the carrier 78. The pinion 73 on the rotational shaft 60 is at the center of the carrier 78. The planetary gears 77 surround and mesh with the pinion 73.

Bearings 83 are located at the front and the rear of the planetary gears 77. The rear bearing 83 is held on the front surface of the bearing holder 71 to support the outer periphery of the rear end of the carrier 78. The front bearing 83 is held on the rear surface of the cover plate 75 to support the outer periphery of the front end of the carrier 78. Each bearing 83 has the same inner and the same outer diameters. A line connecting the centers of the bearings 83 overlaps the paths along which the pins 82 move in planetary motion. The carrier 78 has the front end connected to a rear case 86 of the oil unit 42.

The oil unit 42 includes a front case 85, the rear case 86, and the spindle 43.

The front case 85 is located inside the unit case 7. The front case 85 is cylindrical and has the diameter decreasing frontward in a stepwise manner. A space 87 is defined between the front case 85 and the unit case 7. The space 87 communicates with the internal outlets 17 and the inlets 18 in the unit case 7.

The front case 85 includes a front surface 88 as its front surface having a shaft hole 89. The spindle 43 extends through the shaft hole 89. A sealing O-ring 90 is located between the front surface 88 and the spindle 43.

The front surface 88 receives, at positions radially outward from the shaft hole 89, a pair of screws 91 from the front each with an O-ring 91a in between. An annular front chamber 92 is located behind the front surface 88. The front chamber 92 accommodates a tube 93. The tube 93, which is hollow and encloses air inside, is received in the front chamber 92 annularly. A partition 94 is located behind the tube 93. The partition 94 has multiple cutouts 94a on its outer periphery. A rear chamber 95 is located behind the partition 94. The rear chamber 95 communicates with the front chamber 92 through the cutouts 94a.

The rear case 86 has a rear surface 96 and a side wall 97. The rear surface 96 is disk-shaped and faces the front surface 88 of the front case 85 in the front-rear direction. The side wall 97 is cylindrical and protrudes frontward from the periphery of the rear surface 96. The side wall 97 is screwed into the front case 85 from the rear and connected to the front case 85. A sealing O-ring 98 is located between the side wall 97 and the front case 85.

The side wall 97 is in contact with the partition 94 at its front end. The front case 85 has a step 85a on its inner surface. The partition 94 is fixed between the side wall 97 and the step 85a.

As shown in FIG. 8, the side wall 97 has a pair of projections 99 on its inner peripheral surface. The projections 99 are point-symmetric to each other about the axis of the rear case 86 and are raised inward. The projections 99 each have a sloped cross section with the circumferential width decreasing radially inward.

The rear surface 96 of the rear case 86 has a receiving recess 100 in its center portion. The receiving recess 100 is stepped to have a center portion deeper than an outer portion. The receiving recess 100 receives a cam 101 facing frontward in the center portion. The cam 101 has, at the rear, a flat portion 101a with a width across flats. The cam 101 has a thinner portion 101b at its front. The thinner portion 101b has the thickness gradually decreasing radially outward from the thickest center. The flat portion 101a and the thinner portion 101b are orthogonal to a straight line connecting the centers of the projections 99 as viewed from the front.

The spindle 43 has a through-hole 102 along the axis. The through-hole 102 defines, in its rear portion, a pressurized enclosure 103 in the rear chamber 95. The pressurized enclosure 103 has a circular cross section and receives the cam 101 in a relatively rotatable manner. The spindle 43 has a rear end located outside the cam 101 and supported in the receiving recess 100 on the rear case 86. The spindle 43 includes a middle portion supported by the unit case 7 via a bearing 104. The spindle 43 has a front end protruding frontward through the unit case 7 and the unit case cover 9. A sleeve 105 is located at the front end of the spindle 43. A bit B (FIG. 3), such as a screwdriver bit, is attachable to and detachable from the sleeve 105.

The through-hole 102 has, in its front portion, a front bit insertion hole 106 and a rear pressure-regulating hole 107. The bit insertion hole 106 receives the bit B. The pressure-regulating hole 107 has a smaller diameter than the bit insertion hole 106. The bit insertion hole 106 receives, at its rear end, a bit piece 108. The bit piece 108 is cylindrical and receives the rear end of the bit B. The bit piece 108 has an inner diameter increasing frontward. The bit insertion hole 106 has, on its inner bottom surface, an annular shoulder 109. The bit piece 108 is in contact with the shoulder 109 and is thus restricted from moving backward.

The pressure-regulating hole 107 receives a pressure valve 110. The pressure valve 110 has a front threaded portion 111 and a rear sealing portion 112. The threaded portion 111 has a slightly smaller diameter than the sealing portion 112. The threaded portion 111 has, on its front surface, an engagement groove 113. The engagement groove 113 is engageable with a tool such as a screwdriver. Two O-rings 112a are externally mounted on the sealing portion 112. The O-rings 112a between the sealing portion 112 and the inner surface of the pressure-regulating hole 107 seal the pressure-regulating hole 107.

The pressure-regulating hole 107 has, in its front portion, an internal thread 114. The threaded portion 111 in the pressure valve 110 is screwed into the internal thread 114. The pressure-regulating hole 107 has a larger-diameter portion 115 in the rear. The larger-diameter portion 115 receives the sealing portion 112. An annular stopper 116 is located between the internal thread 114 and the larger-diameter portion 115.

The bit piece 108 is attached from the front of the spindle 43. The pressure valve 110 is attached from the rear of the spindle 43. The bit piece 108 is placed into the bit insertion hole 106 from the front and is accommodated in the bit insertion hole 106 at its position in contact with the shoulder 109. The pressure valve 110 is placed into the pressure-regulating hole 107 from the rear and is accommodated in the pressure-regulating hole 107 at a position of the threaded portion 111 screwed into the internal thread 114. In this state, the sealing portion 112 closes the larger-diameter portion 115.

The pressure valve 110 attached as above, the front case 85, the rear case 86, the screws 91, and the spindle 43 define a sealed space including the front chamber 92 and the rear chamber 95. The sealed space contains oil.

Before the bit piece 108 is attached, the pressure valve 110 is rotated through the engagement groove 113. This moves the threaded portion 111 through screw engagement to allow the pressure valve 110 to be movable back and forth in the axial direction. The oil pressure (output) is thus adjustable.

The pressure valve 110 moving forward through screw engagement is restricted from moving forward at a contact position of the larger-diameter sealing portion 112 with the stopper 116. At this movement-restricting position, as shown in FIG. 4, the threaded portion 111 has its front end away from the rear end of the bit piece 108 in contact with the shoulder 109, and thus out of contact with the bit piece 108.

The internal thread 114 has a smaller diameter than the larger-diameter portion 115. Thus, the shoulder 109 in contact with the bit piece 108 has a larger area to reliably restrict the backward movement of the bit piece 108.

As shown in FIG. 8, the spindle 43 has a rear portion 43a having an elongated cross section extending across the diameter of the rear case 86. However, the longitudinal dimension of the rear portion 43a is shorter than the distance between the projections 99 facing each other on the rear case 86. The rear portion 43a is located between the partition 94 and the rear surface 96 of the rear case 86. As shown in FIG. 4, the rear portion 43a has, in its front and rear portions, a front communication hole 117 and a rear communication hole 118 each extending radially through the spindle 43. The direction in which the front communication hole 117 and the rear communication hole 118 extend is orthogonal to the radial direction in which the rear portion 43a extends. The front communication hole 117 allows communication between the pressurized enclosure 103 and the rear chamber 95 when the rear portion 43a is in contact with the partition 94. The rear communication hole 118 allows communication between the pressurized enclosure 103 and the rear chamber 95 when the rear portion 43a is in contact with the rear surface 96.

The rear portion 43a has a pair of holes 119 radially outside the thinner portion 101b of the cam 101. The holes 119 communicate with the pressurized enclosure 103 and extend radially through the spindle 43. The holes 119 extend in the same direction in which the rear portion 43a extends. The holes 119 each receive a ball 120. Each ball 120 is radially movable in the hole 119. The ball 120 moving inward can come in contact with the thinner portion 101b of the cam 101.

A pair of holding grooves 121 are located on the longitudinal ends of the rear portion 43a. The holding grooves 121 communicate with the respective holes 119. The holding grooves 121 each extend in the front-rear direction and are open along the longitudinal ends of the rear portion 43a.

Each holding groove 121 receives a blade 122. Each blade 122 has a width substantially within the circumferential width of the holding groove 121 and a length substantially within the entire length of the holding groove 121 in the front-rear direction. The blade 122 is held in the holding groove 121 in a manner movable in the radial direction of the spindle 43. The blade 122 moving inward can come in contact with the ball 120. The blade 122 has its radially outer end with a width decreasing radially outward to slope. The blade 122 includes a boss 123 protruding inward from its radially internal end face. The axial line of the boss 123 aligns with a line passing through the center of the ball 120 in the radial direction of the spindle 43. In other words, the ball 120 and the boss 123 are aligned with each other in the radial direction of the spindle 43.

A ring groove 124 is located at a position on the basal end of the boss 123 at the end face of the blade 122. A coil spring 125 is externally mounted on each boss 123. The coil spring 125 has one end received in the ring groove 124. The coil spring 125 has the other end in contact with the bottom surface of the holding groove 121. The blades 122 are thus pushed radially outward when the balls 120 come in contact with the bosses 123. The blades 122 are also urged radially outward by the coil springs 125.

As shown in FIG. 8, when the thinner portion 101b of the cam 101 is parallel to the longer sides of the rear portion 43a in the cross section in the pressurized enclosure 103 in the rear portion 43a, the cam 101 pushes the balls 120 radially outward. The balls 120 and the coil springs 125 also push the blades 122 radially outward. In this state, the blades 122 approach or come in contact with the inner peripheral surface of the rear case 86. At this position, the blades 122 may hit the projections 99 in the circumferential direction.

To operate the soft impact driver 1 according to the present embodiment, a user holding the grip 3 pulls the trigger 31 with the bit B received in the bit insertion hole 106 in the spindle 43. The switch 30 is then turned on to cause the battery pack 5 to supply a three-phase current to the stator 44 in the brushless motor 40, thus rotating the rotor 45. More specifically, the microcomputer in the control circuit board 36 receives, from a rotation detection element in the sensor circuit board 51, a rotation detection signal indicating the positions of the sensor permanent magnets 63 in the rotor 45, and determines the rotational state of the rotor 45. The microcomputer then controls the on-off state of each switching element in accordance with the determined rotational state, and feeds a three-phase current sequentially through the coils 48 in the stator 44. This rotates the rotational shaft 60 together with the rotor 45.

The rotation of the rotational shaft 60 is transmitted to the planetary gears 77 via the pinion 73. The planetary gears 77 revolving in the internal gear 76 reduce the rotation to be transmitted to the rear case 86 of the oil unit 42 through the carrier 78. The rear case 86 thus rotates together with the front case 85.

The cam 101 rotates counterclockwise in FIG. 8 together with the rear case 86 in the oil unit 42. The thinner portion 101b of the cam 101 then pushes the blades 122 out of the rear portion 43a via the balls 120. The urging force from the coil springs 125 also contributes to pushing out the blades 122. The thinner portion 101b is rotated further to be parallel to the rear portion 43a as shown in FIG. 8. At this position, the thinner portion 101b pushes the balls 120 and the blades 122 most outwardly.

At the positions of the blades 122 pushed out by the balls 120 alone, the distal end of each blade 122 does not come in contact with the inner peripheral surface of the rear case 86. However, the coil springs 125 push the blades 122 further radially outward apart from the balls 120 to cause the blades 122 to come in contact with the inner peripheral surface of the rear case 86.

Figure 12A:
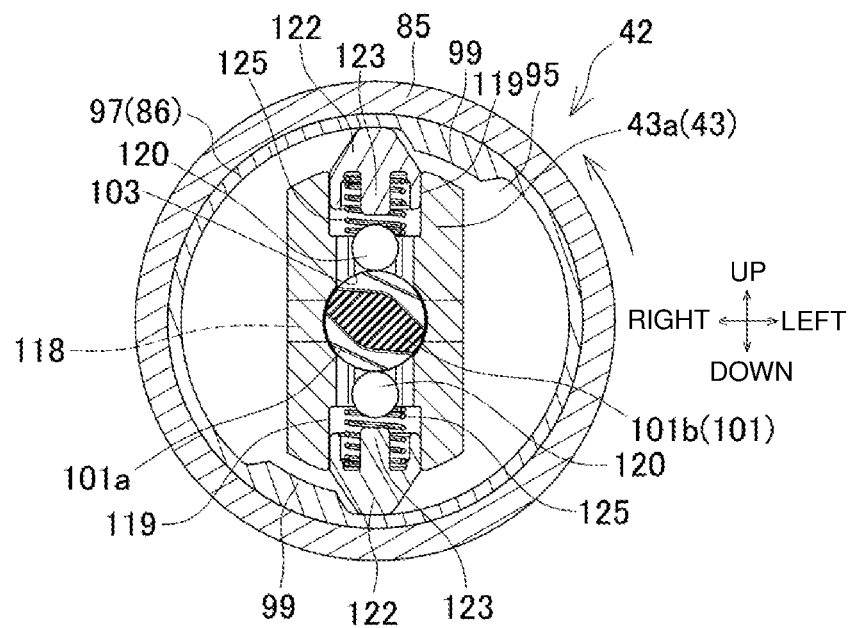
FIG. 12A is a diagram describing the operation of an oil unit immediately before striking.

When the rear case 86 and the cam 101 rotate still further, the blades 122 come in contact with the projections 99 as shown in FIG. 12A.

At this rotational position, the thinner portion 101b closes the path between the rear communication hole 118 and the pressurized enclosure 103, increasing the oil pressure inside the pressurized enclosure 103. This retains the blades 122 that have been pushed out. The blades 122 hitting the projections 99 produce impact torque (impact) in the spindle 43. With the oil having lower viscosity when the impact is produced, the blades 122 retract in a larger stroke from the inner peripheral surface of the rear case 86 after reaching the inner peripheral surface. The urging force from the coil springs 125 also applies a resistance against retracting. This reduces the decrease in the impact torque.

Figure 12B:
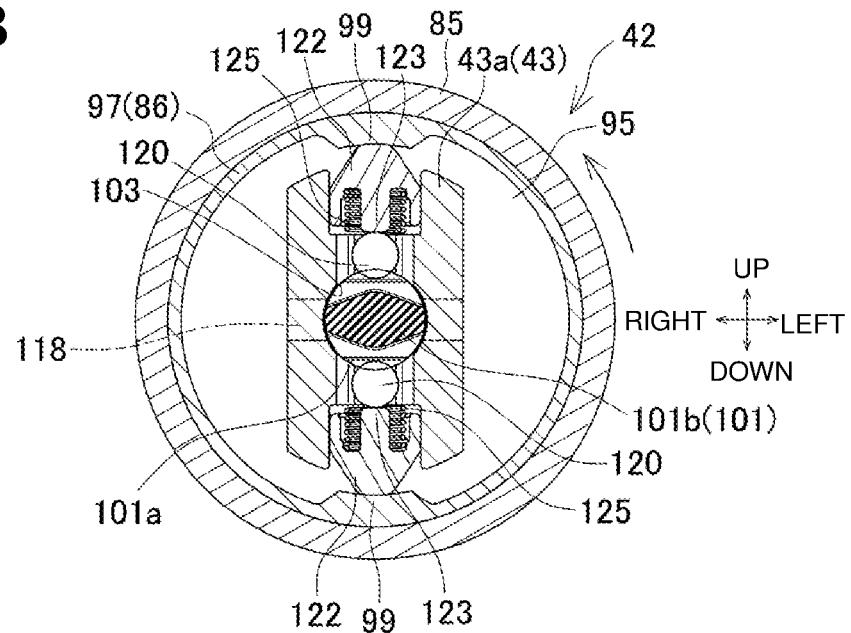
FIG. 12B is a diagram describing the operation of the oil unit after striking.

After the impact torque is produced, each blade 122 retracts inward with the slope guided along a slope on the corresponding projection 99 as shown in FIG. 12B. The oil in the pressurized enclosure 103 flows into the rear chamber 95 through the clearance between the components, thus allowing the blades 122 to retract. The retracted blades 122 move relatively over the projections 99.

After the blades 122 move over the projections 99, the path between the rear communication hole 118 and the pressurized enclosure 103 opens as the rear case 86 and the cam 101 rotate. The cam 101 pushes the blades 122 via the balls 120 again.

The repeated operation produces the impact torque twice per rotation of the rear case 86.

This allows screwing or other operations using the bit B received in the bit insertion hole 106 in the spindle 43. When the bit B is pressed against a workpiece, the bit B is pressed inward in the bit insertion hole 106 to apply a pressing force to the bit piece 108 receiving the bit B. However, the shoulder 109 in the bit insertion hole 106 restricts the retraction of the bit piece 108, preventing the retracting bit piece 108 from coming in contact with the pressure valve 110.

When the pressure valve 110 is fully rotated frontward to adjust the output from the unit case 7, the sealing portion 112 is in contact with the stopper 116 to have the threaded portion 111 being rearward from the bit piece 108. The pressure valve 110 is thus prevented from coming in contact with the bit piece 108.

The fan 65 rotates as the rotational shaft 60 rotates. Then, as indicated with dotted arrows in FIG. 9, the outside air is drawn through the external inlets 23 in the rear end of the unit case cover 9. The outside air flows through the clearance 21 between the unit case cover 9 and the unit case 7 and enters the unit case 7 through the inlets 18. The air then flows through the space 87 between the unit case 7 and the oil unit 42 and enters the right and left air channels 26 through the right and left internal outlets 17. The air then flows backward inside the air channels 26 outside the unit case 7 and the gear case 70 and reaches the brushless motor 40 after passing through the gear case 70. The air then flows through the through-hole 51a in the sensor circuit board 51 and between the stator 44 and the rotor 45 to reach the fan 65, and is then discharged through the outlets 66.

The airflow cools the oil unit 42, the reduction mechanism 41, and the brushless motor 40 in this order. Heat exchange occurs between the heat generated in the oil unit 42 and the air flowing outside the oil unit 42. The air with increased temperature flows through the reduction mechanism 41 and the brushless motor 40 in this order. This reduces an increase in the temperature of the oil unit 42, and slowly increases the temperature of the brushless motor 40 to allow the oil unit 42 and the brushless motor 40 to have similar temperature changes.

As shown in FIG. 10, air flowing through the brushless motor 40 comes in contact with the insulator 47A. The thermistor 55 in the temperature sensing plate 54 thus detects the temperature of the stator 44.

The control circuit board 36 in the controller 35 monitors the temperature (resistance) detected by the thermistor 55. In response to the detected temperature reaching a preset temperature (e.g., 70 to 90° C.), the control circuit board 36 stops powering the stator 44 to stop the driving of the brushless motor 40. The oil unit 42 and the brushless motor 40 have similar temperature changes under the airflow described above. Thus, the brushless motor 40 stops being driven at an appropriate time based on the detected temperature of the stator 44 in accordance with the temperature change of the oil unit 42.

The soft impact driver 1 according to the present embodiment includes the brushless motor 40 (motor) and the oil unit 42 located frontward from the brushless motor 40 and drivable by the brushless motor 40. The soft impact driver 1 also includes the spindle 43 (rotational shaft) located frontward from the oil unit 42 and drivable by the oil unit 42, and the cylindrical portion 6c and the rear cover 8 (motor housing) accommodating the brushless motor 40. The soft impact driver 1 also includes the grip 3 located below the cylindrical portion 6c and the rear cover 8, and the unit case 7 accommodating the oil unit 42 and located frontward from the cylindrical portion 6c. The unit case 7 has the inlets 18. The rear cover 8 has the outlets 66. The inlets 18 are located in the unit case 7 alone. The outlets 66 are located in the cylindrical portion 6c and the rear cover 8 alone. The flow of air drawn in through the inlets 18 and discharged through the outlets 66 cools the oil unit 42 and the brushless motor 40. The thermistor 55 (temperature detector) is located on the brushless motor 40.

This structure allows the temperature of the brushless motor 40 detected by the thermistor 55 to follow the temperature of the oil unit 42. The temperature of the oil unit 42 can thus be appropriately detected during a continuous operation. Any malfunction can be avoided by, for example, stopping the driving of the brushless motor 40 in a timely manner. This achieves product protection and maintains workability.

The soft impact driver 1 includes the controller 35 that controls the driving of the brushless motor 40. In response to the temperature of the brushless motor 40 detected by the thermistor 55 reaching a preset temperature, the controller 35 stops the driving of the brushless motor 40.

The driving of the brushless motor 40 can thus be stopped in a timely manner before any malfunction occurs.

The brushless motor 40 includes the stator 44 and the rotor 45 located inside the stator 44. The thermistor 55 is located on the stator 44. The temperature of the stator 44 can thus be detected accurately.

The stator 44 includes the insulator 47A. The thermistor 55 is located on the insulator 47A. The thermistor 55 on the insulator 47A is thus easily mountable.

The thermistor is used as a temperature detector. The resistance can thus be detected to determine the set temperature accurately.

The space 87 communicating with the inlets 18 is defined between the oil unit 42 and the unit case 7. The unit case 7 has the internal outlets 17 communicating with the space 87. Air thus flows between the oil unit 42 and the unit case 7 to enable efficient heat exchange for the heat of the oil unit 42.

The unit case 7 has the internal outlets 17 on its right and left to allow the air to flow through between the oil unit 42 and the unit case 7 in a balanced manner.

The unit case 7 has the rear portion held by the cylindrical portion 6c. The air channels 26 communicating with the internal outlets 17 are defined between the cylindrical portion 6c and the unit case 7. The air channels 26 thus reliably guide the air that has passed by the oil unit 42 toward the brushless motor 40.

The air channels 26 communicate with the space accommodating the brushless motor 40 inside the cylindrical portion 6c. The air flowing from the air channels 26 can thus reliably come in contact with the brushless motor 40.

The air channels 26 are located on the right and left of the cylindrical portion 6c. The air that has passed by the oil unit 42 can thus be guided toward the brushless motor 40 in a balanced manner.

The brushless motor 40 includes the rotational shaft 60 extending in the front-rear direction. The soft impact driver 1 includes the fan 65 located on the rear end of the rotational shaft 60. The air that has passed by the oil unit 42 can thus flow along the entire length of the brushless motor 40. This structure also allows the temperature of the oil unit 42 to follow the temperature of the brushless motor 40 accurately.

The rear cover 8 has the outlets 66 radially outside the fan 65. This structure enables discharge of air from the rearmost portion of the body 2.

The soft impact driver 1 includes the unit case cover 9 that covers the unit case 7 with the clearance 21 in between. The unit case cover 9 has the external inlets 23 communicating with the inlets 18 through the clearance 21. This structure reduces the likelihood that foreign matter such as water and dust enters the unit case 7 having the inlets 18.

The unit case cover 9 assembled with the cylindrical portion 6c has the rear end in contact with the front end of the cylindrical portion 6c. The unit case cover 9 has the cutouts 22 in the rear end. The external inlets 23 are defined between the cutouts 22 and the front end of the cylindrical portion 6c. The external inlets 23 are thus easily defined using the cylindrical portion 6c.

The external inlets 23 are located in the circumferential direction of the unit case 7. This structure allows air to be drawn in a balanced manner.

The inlets 18 are located in a front portion of the unit case 7. This structure allows air for cooling the oil unit 42 to be drawn in.

Modifications will now be described.

The number of cutouts in the unit case cover and their shape are not limited to those described in the above embodiment. The unit case cover may have, instead of the cutouts in the rear end, through-holes in a middle portion or in the front end to define external inlets. The unit case cover may be eliminated.

The number of inlets in the unit case and their shape may also be changed as appropriate.

The number of internal outlets in the unit case and their shape are also not limited to those described in the above embodiment. For example, the unit case may have three or more internal outlets in the circumferential direction, and the internal outlets may be elongated in the front-rear direction.

The number of extensions in the body housing and their shape are not limited to those described in the above embodiment. For example, the body housing may include three or more extensions in the circumferential direction, or the extensions each may not have an L-shaped cross section but may have another shape such as a trapezoid in a cross section. The extensions may be eliminated. Instead, one or more air channels may be defined to guide air toward the motor.

The thermistor may be located on the rear insulator, instead of being on the front insulator. The thermistor may be located on another component such as the sensor circuit board, instead of being on either insulator. Multiple thermistors may be used to monitor the average of detected temperatures. A temperature detector other than a thermistor may be used.

Although the driving of the brushless motor is controlled to stop in response to the thermistor reaching a set temperature in the above embodiment, another operation may be performed. For example, the rotational speed of the motor may be reduced without the motor being stopped immediately.

The structure of the oil unit is not limited to the structure described in the above embodiment.

For example, the balls and the coil springs for pushing out the blades may not be arranged in the radial direction of the spindle, but may be arranged in the front-rear direction along the axial direction of the spindle. In this case, pins or other pushing members may be used instead of the balls. A single coil spring may extend through the spindle to urge the blades outward.

The numbers of blades and balls may be increased or decreased as appropriate. For example, instead of a pair of blades and balls, one blade and one ball or three or more of each may be used. The coil springs may be eliminated.

The unit case may include three or more components including the front case and the rear case. The partition may be eliminated not to separate the front chamber and the rear chamber. The tube may be eliminated.

An oil unit to be used may include no balls and no coil springs and use relative rotation of the case and the spindle to swing the blades in the case and thus control the oil pressure. For example, such an oil unit may include, in a spindle, one or more blades that are urged radially outward. The blades each have one side that intermittently receives high fluid pressure as a case defining an oil chamber rotates. In this structure, the blades tilt in the rotational direction to be sealed by a sealing portion in the case and a groove on the spindle. The blades are thus pressed against the spindle, creating an impact to rotate the spindle.

The motor is not limited to a brushless motor, but may be a commutator motor. The present disclosure is also applicable to a tool powered by alternating current (AC) without including a battery pack.

REFERENCE SIGNS LIST 1 soft impact driver
2 body
3 grip
6 body housing
6c cylindrical portion
7 unit case
8 rear cover
9 unit case cover
12 rear portion
13 front portion
17 internal outlet
18 inlet
21 clearance
23 external inlet
25 extension
26 air channel
35 controller
36 control circuit board
40 brushless motor
41 reduction mechanism
42 oil unit
43 spindle
44 stator
45 rotor
54 temperature sensing plate
55 thermistor
60 rotational shaft
65 fan
66 outlet
70 gear case
85 front case
86 rear case
87 space
99 projection
101 cam
122 blade
B bit

What is claimed is:

1. An oil pulse tool, comprising:
a motor;
an oil unit in front of the motor and configured to be rotated by the motor;
a rotational shaft in front of the oil unit and configured to be driven by the oil unit;
a motor housing accommodating the motor and having an air outlet to ambient air:
a grip below the motor housing; and
a unit case (i) accommodating the oil unit, (ii) in front of the motor housing, and (iii) having an air inlet for ambient air, wherein:
the motor housing is configured to prevent ambient air from entering the motor housing such that the motor housing only receives air from the unit case; and
the air outlet is only in the motor housing.

2. The oil pulse tool according to claim 1, further comprising:
a temperature detector on the motor.

3. The oil pulse tool according to claim 2, further comprising:
a controller configured to control driving of the motor, wherein the controller is configured to stop the driving of the motor in response to a temperature of the motor detected by the temperature detector reaching a preset temperature.

4. The oil pulse tool according to claim 2, wherein the motor includes
a stator, and
a rotor inside the stator, and
the temperature detector is on the stator.

5. The oil pulse tool according to claim 4, wherein the stator includes an insulator, and
the temperature detector is on the insulator.

6. The oil pulse tool according to claim 2, wherein the temperature detector includes a thermistor.

7. The oil pulse tool according to claim 2, wherein the oil unit, the motor, the unit case and the motor housing are configured such that the oil unit and the motor are cooled by a flow of air drawn in through the air inlet in the unit case and discharged through the air outlet in the motor housing.

8. The oil pulse tool according to claim 1, wherein the oil unit, the motor, the unit case and the motor housing are configured such that the oil unit and the motor are cooled by a flow of air drawn in through the air inlet in the unit case and discharged through the air outlet in the motor housing.

9. The oil pulse tool according to claim 1, wherein the oil unit and the unit case define a space that is in communication with the air inlet, and
the unit case has an internal outlet communicating with the space.

10. The oil pulse tool according to claim 9, wherein the unit case has the internal outlet in each of a right and a left of the unit case.

11. The oil pulse tool according to claim 9, wherein the unit case includes a rear portion held by the motor housing, and
the motor housing and the rear portion of the unit case define an air channel that is in communication with the internal outlet.

12. The oil pulse tool according to claim 11, wherein the air channel communicates with an area accommodating the motor inside the motor housing.

13. The oil pulse tool according to claim 11, wherein the air channel is on each of a right and a left of the motor housing.

14. The oil pulse tool according to claim 1, wherein the motor includes a motor rotational shaft extending in a front-rear direction, and
the oil pulse tool further includes a fan on a rear end of the motor rotational shaft.

15. The oil pulse tool according to claim 14, wherein the air outlet in the motor housing is radially outside the fan.

16. The oil pulse tool according to claim 1, further comprising:
a unit case cover covering the unit case with a clearance between the unit case cover and the unit case,
wherein the unit case cover has an external inlet communicating with the air inlet through the clearance.

17. The oil pulse tool according to claim 16, wherein
the unit case cover assembled with the motor housing has
(i) a rear end in contact with a front end of the motor housing and (ii) a cutout in the rear end, and
the external inlet is between the cutout and the front end.

18. The oil pulse tool according to claim 16, wherein
the unit case cover has a plurality of the external inlets in a circumferential direction of the unit case.

19. The oil pulse tool according to claim 16, wherein
the unit case has a plurality of the air inlets in a front portion of the unit case.

20. An oil pulse tool, comprising:
a motor;
an oil unit (i) in front of the motor and (ii) driven by the motor;
a rotational shaft in front of the oil unit and driven by the oil unit;
a motor housing accommodating the motor and having a plurality of air outlets to ambient air;
a grip below the motor housing; and
a unit case (i) accommodating the oil unit, (ii) in front of the motor housing, (iii) having a plurality of air inlets for ambient air; wherein:
all of the plurality of air inlets are in the unit case;
all of the plurality of air outlets are in the motor housing;
the motor housing is configured to prevent ambient air from entering the motor housing such that the motor housing only receives air from the unit case.

* * * * *